US007934916B2

(12) United States Patent
Smith et al.

(10) Patent No.: US 7,934,916 B2
(45) Date of Patent: May 3, 2011

(54) CUSTOM EARPIECE

(75) Inventors: Richard C. Smith, Costa Mesa, CA (US); Diann Y. Smith, Costa Mesa, CA (US)

(73) Assignee: SureFire, LLC, Fountain Valley, CA (US)

( * ) Notice: Subject to any disclaimer, the term of this patent is extended or adjusted under 35 U.S.C. 154(b) by 770 days.

(21) Appl. No.: 11/872,315

(22) Filed: Oct. 15, 2007

(65) Prior Publication Data

US 2009/0095767 A1 Apr. 16, 2009

(51) Int. Cl.
*B29D 99/00* (2010.01)

(52) U.S. Cl. ............ 425/2; 222/94; 222/136; 222/145.6

(58) Field of Classification Search .............. 425/2, 543; 264/240, 313, DIG. 30; 181/130; 381/328; 222/94, 136, 145.6
See application file for complete search history.

(56) References Cited

U.S. PATENT DOCUMENTS

| | | | | |
|---|---|---|---|---|
| 3,239,105 | A * | 3/1966 | Woodson | 222/94 |
| 4,538,920 | A * | 9/1985 | Drake | 366/181.5 |
| 4,871,502 | A * | 10/1989 | LeBisch et al. | 264/222 |
| 5,321,757 | A * | 6/1994 | Woodfill, Jr. | 381/312 |
| 5,333,622 | A * | 8/1994 | Casali et al. | 128/864 |
| 5,501,371 | A * | 3/1996 | Schwartz-Feldman | 222/136 |
| 6,022,311 | A * | 2/2000 | Juneau et al. | 600/25 |
| 6,339,648 | B1 * | 1/2002 | McIntosh et al. | 381/328 |
| 6,629,774 | B1 * | 10/2003 | Gruendeman | 366/336 |
| 6,843,652 | B2 * | 1/2005 | Xie et al. | 433/90 |
| 7,661,558 | B2 * | 2/2010 | De Laforcade | 222/94 |
| 2004/0186480 | A1 * | 9/2004 | Lin et al. | 606/92 |

* cited by examiner

*Primary Examiner* — Robert B Davis
(74) *Attorney, Agent, or Firm* — Haynes and Boone, LLP

(57) ABSTRACT

A system for making custom earpieces is disclosed. The system can include a two-component dispensing container such as a two-component syringe or a two-component squeeze bulb. The two components stored in the two-component dispensing container are kept separate until they are dispensed. The two components can be dispensed into a balloon disposed within the ear canal of a user. The two components can define an earpiece after they are dispensed into the balloon. A mixer mixes the two components as they are dispensed. The balloon can be attached to the two-component dispensing container such that two components enter the balloon after the two components are mixed. In this manner, a more comfortable and effective custom earpiece can be made more safely and more conveniently.

26 Claims, 3 Drawing Sheets

CUSTOM EARPIECE

TECHNICAL FIELD

The present invention relates generally to audiology. The present invention relates more particularly to a method and system for making custom earpieces such as those used for hearing protection, hearing aids, and communications.

BACKGROUND

It is well known that high levels of ambient noise can cause hearing loss. Hearing protection can be used in noisy environments in an attempt to mitigate hearing loss. Hearing protection is commonly used in such noisy environments as manufacturing facilities, warehouses, construction sites, shooting ranges, battlefields, and airports. Typically, any time that loud machinery is being operated, guns are being fired, or any other source of excessive noise is present, hearing protection is desirable so as to reduce discomfort and so as to conserve hearing. Hearing protection can lower the level of sound substantially before it reaches the eardrum. Thus, hearing protection can mitigate damage to the ear.

Contemporary hearing protection typically comprises either a noise reducing headset or earplugs. Headsets have cups or earpieces that generally surround the outer ear and reduce the level of noise that is incident thereon. Earplugs, by way of contrast, are inserted into the ear canal, where they reduce the level of sound transmitted therethrough to the eardrum. Both headsets and earplugs have proven effective in conserving hearing.

Although contemporary headsets are generally effective in reducing noise exposure, they suffer from deficiencies that tend to make them unsuitable for some applications. Headsets are bulky. They cannot be worn in environments where they can get in the way and they cannot be worn under helmets. Headsets are subject to being knocked off of a person's head by others and by items in the user's environment.

Headsets often become uncomfortable after being worn for an extended period of time. Because of this, users may discontinue their use, i.e., remove the headset, while they remain within a noisy environment. Users may alternatively stretch the earpieces of the headset apart from one another, so that they do not apply as much pressure to the sides of the head. This may be done in an attempt to decrease discomfort. However, when the pressure is reduced in this manner, then the cups of the headset may not seal properly and thus may permit the introduction of excessive sound. Noise exposure is undesirably increased and the likelihood of hearing loss is consequently increased as well.

Contemporary earplugs can also be effective. Earplugs can generally be worn with helmets. Earplugs are not as susceptible to being knocked off of a user as are headsets. However, like headsets, earplugs can become uncomfortable when worn for extended periods of time. This is particularly true if the earplugs do not fit properly.

Off-the-shelf earplugs tend to be uncomfortable and may not seal the ear properly. If earplugs do not seal the ear properly, then excessive noise is permitted to reach the eardrum. Off-the-shelf earplugs are not made specifically to fit a particular individual's ear. As those skilled in the art will appreciate, individuals have a wide range of ear canal shapes and sizes. Thus, it will be appreciated that it is difficult to provide an off-the-shelf earplug that is comfortable and effective for a large number of individuals.

Custom earplugs mitigate the problems discussed above regarding off-the-shelf earplugs. Custom earplugs are molded into a user's ear canal so that they fit properly. Because of the better fit, custom earplugs tend to be substantially more comfortable and effective than off-the-shelf earplugs.

However, according to contemporary methodology, custom earplugs require considerable effort to make. A two-part compound must be measured, mixed, and inserted into the user's ear canal. Care must be taken to assure that the correct materials and proportions are used. Care must also be taken to assure that the components are adequately mixed. Care must also be taken to assure that the compound is applied sufficiently deep into the ear canal so as to be effective, while at the same time assuring that the compound is not applied so deeply into the ear canal as to contact the eardrum.

If the compound contacts the eardrum, it may cause discomfort, pain, and possible damage to the eardrum. It may also result in the making of an earplug that extends too far into the ear canal such that the resulting earplug may cause discomfort, pain, and possibly damage to the eardrum when worn.

Earpieces for use with hearing aids, such as behind-the-ear (BTE) and in-the-ear (ITE) hearing aids, are well known. Hearing aid earpieces can be custom made, generally in the manner described above. Thus, hearing aid earpieces can suffer from the same problems regarding their fabrication.

Earpieces for use with two-way radios are well known. Law enforcement, security, and military personnel frequently wear earpieces that fit into the conchae bowl of the ear so as to facilitate listening to two-way radios and the like. Such earpieces are different from earplugs in that they are intended to allow some sound to enter the ear. These earpieces are attached via acoustic tubing to a small speaker. Communications received by a two-way radio are reproduced by the speaker. Sound then travels through the acoustic tubing to the user's ear, where the end of the acoustic tubing is held in place by the earpiece. In this manner, communications received by the two-way radio can be heard without letting others nearby hear the communications as well.

Communications earpieces can be custom made, generally in the manner described above. Thus, communications earpieces can suffer from the same problems regarding their fabrication.

Although such contemporary earplugs and earpieces are generally suitable for their intended purposes, they suffer from inherent deficiencies that tend to detract from their overall usefulness. It is, therefore, desirable to provide a method and system for making earplugs and earpieces that mitigate the likelihood of mistakes relating to selecting the proper components of the earpiece, using the correct proportions of the components, mixing the components, and inserting the mixed components into the ear canal.

BRIEF SUMMARY

Systems and methods are disclosed herein to provide a convenient and simple way to make custom earpieces for use as earplugs, hearing aid earpieces, and communications earpieces. The need to select the proper components of a two-component compound, dispense the proper proportions of a two-component compound, and manually mix the two components properly is eliminated. Features can be provided to assure that the correct amount and proportions of the two-component compound are used, that the components are properly mixed, and that the two-component compound does not contact the eardrum.

According to an embodiment, a system for making an earpiece comprises a two-component dispensing container having two components stored therein such that the two components are kept separate until they are dispensed from the two-component dispensing container and also comprises a mixer for mixing the two components as they are dispensed. The mixer can be attached to the two-component dispensing container. Alternatively, the mixer can be separate from the two-component dispensing container. The two components are suitable to define an earpiece after they are mixed together. For example, the two components can define a silicon compound after being mixed together.

Optionally, a balloon can be attached to the two-component dispensing container such that two components enter the balloon after the two components are mixed. The balloon is inserted into the ear canal when the two-components are dispensed. The balloon thus prevents contact of the two components with tissues of the ear canal as the two components are dispensed and cure. Some people may find such contact objectionable. The balloon also tends to define, at least to some degree, the size of the earpiece and the distance to which the earpiece extends into the ear canal.

According to an embodiment, a two component dispensing system comprises a two-component dispensing container and a mixer configured to mix material dispensed from the two-component dispensing container, wherein the two component dispensing container is configured to facilitate attachment of a balloon thereto. The balloon can be configured to help define an earpiece when material from the two-component syringe is dispensed thereinto. Indeed, the balloon can have an unfilled (deflated) shaped that is somewhat like that of an earpiece.

The two-component dispensing container can, for example, comprise a two-component syringe. As a further example, the two component dispensing container can comprise a two-component squeeze bulb. The two-component syringe and the two-component squeeze bulb can have two compartments that keep the two components separate until they are dispensed.

According to an embodiment, a balloon can be configured to attach to a two-component dispensing container and can be configured to define an earpiece when filled with material from the two component dispensing container. The balloon can have a shape that is at least somewhat consistent with the shape of the earpiece. The balloon can have a diameter or cross-sectional area that generally decreases from the outer end to the inner end thereof such that its shape better conforms to that of an earpiece.

According to an embodiment, a method for making an earpiece can comprise dispensing two components from a two-component dispensing container, mixing the two components as the two components are dispensed from the two-component dispensing container, and dispensing the mixed components into an ear canal so as to define an earpiece. The mixed components can be dispensed into a balloon that is disposed at least partially within the ear canal.

According to an embodiment, a system for making an earpiece can comprise means for dispensing two components into an ear canal and means for mixing the two components as the two components are dispensed.

According to an embodiment, a two-component dispensing system for making an earpiece can comprise a two-component syringe and two components contained within the two-component syringe. The two components, when combined, are suitable for forming an earpiece. For example, the two components can form a silicon compound when mixed.

According to an embodiment, a two-component dispensing system for making an earpiece can comprise a two-component squeeze bulb and two components contained within the two-component squeeze bulb. The two components, when combined, are suitable for forming an earpiece. For example, the two components can form a silicon compound when mixed.

Benefits include elimination of the need to determine proportions of a two-component compound and elimination of the need to manually mix the two components, as is required according to contemporary methodology. By eliminating the need to determine proportions and to manually mix the two-component compound, the likelihood of making mistakes is substantially reduced.

Features are provided to assure that the correct amount of the two-component compound is used and that the two-component compound does not contact the eardrum. For example, the use of a balloon and a stop mitigate the likelihood of the two-component compound contacting and damaging delicate tissues of the ear, such as the eardrum.

This invention will be more fully understood in conjunction with the following detailed description taken together with the following drawings.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
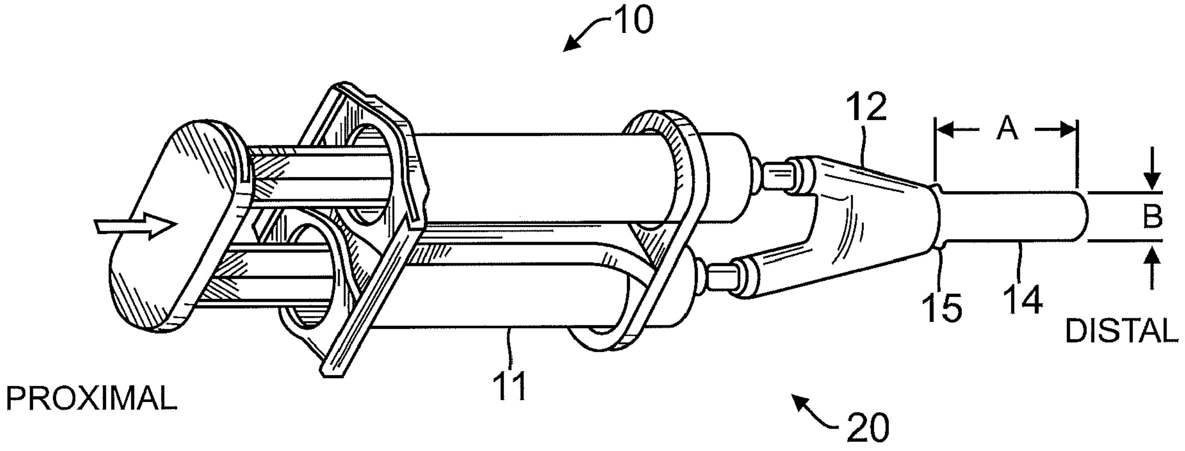
FIG. 1 is a semi-schematic perspective view of a system for making an earpiece according to an example of an embodiment of the present invention, wherein the balloon is attached to the mixer of the two-component syringe, such as prior to insertion of the balloon into an ear canal.

A method and system for making custom earpieces are disclosed. According to an example of an embodiment, a two-component compound is mixed and dispensed into a balloon while the balloon is disposed within a user's ear canal. The balloon expands as the compound is dispensed thereinto. As the balloon expands, it conforms to the shape of the ear canal so as to define a custom earpiece.

The two components of the compound can be pre-packaged within a two-component dispenser/mixer. Use of a two-component dispenser/mixer assures that the correct components are used and that the two components are used in the correct proportions. The two component dispenser/mixer can be configured such that it limits the distance that the balloon is inserted into the ear canal, so as to prevent the balloon from undesirably touching the eardrum.

Examples of suitable components of the two-component compound are disclosed in United States patent application publication number 2006/0177082, published on Aug. 10, 2006, the entire contents of which are hereby incorporated expressly by reference. For example, one of the two components can comprise a crosslinkable polymer such as a silicone putty and the other of the two components can comprise a hardening agent comprised of, for example, an alkyl silicate or partially hydrolyzed alkyl silicate and a catalyst.

The crosslinkable polymer can comprise a silicon-based polymer such as a siloxane. The alkyl silicate can comprise a non-ionic organosilicate. The catalyst can comprise a metallic salt of an organic carboxylic acid.

The two-component compound can comprise a silicone molding material known as "Knead A Mold,"® registered trademark of Townsend, Stanly D, an individual, which is supplied by A2Z Solutions, Inc. of Chattanooga, Tenn. The two-component compound can comprise a silicon-based polymer such as an organopolysiloxane.

The balloon can be formed of a biocompatible material. The balloon can be an elastic balloon, such as a balloon made of silicone rubber or the like. In this manner, the balloon can stretch from an unfilled smaller size to a filled larger size. The unfilled configuration of the balloon can be generally cylindrical or can be tapered from a larger diameter proximate the outside end (which is farthest from to the eardrum when worn) of the balloon to a smaller diameter proximate the inside end (which is closest to the eardrum when worn) of the balloon. The balloon can have a shape that approximates that of an earpiece, but is generally smaller than an earpiece such that the balloon stretches to its final size when filled.

Alternatively, the balloon can be formed of a semi-elastic (less elastic than silicone rubber) material or a non-elastic material. Thus, the balloon can be configured so as to stretch less than a silicone rubber balloon or not stretch at all. For example, the balloon can have an unfilled size and shape that conforms substantially to the size and shape an ear canal and/or conchae when filled without substantial stretching.

Earpieces made according to examples of embodiments can be used for hearing protection (as earplugs), for hearing aids, and/or for communications (such as via a two-way radio). Such earpieces can be used for combinations of such applications. For example, a single earpiece can both be used with a two-way radio (to facilitate communications) and to provide hearing protection.

Referring now to FIG. 1, a system 10 for making an earpiece comprises a two-component dispensing container/mixer 20 and a balloon 14 that can be attached to the two-component dispensing container/mixer 20. The two-component dispensing container/mixer 20 can comprise a two-component dispensing container such as a two-component syringe 11 and a mixer 12.

Figure 2:
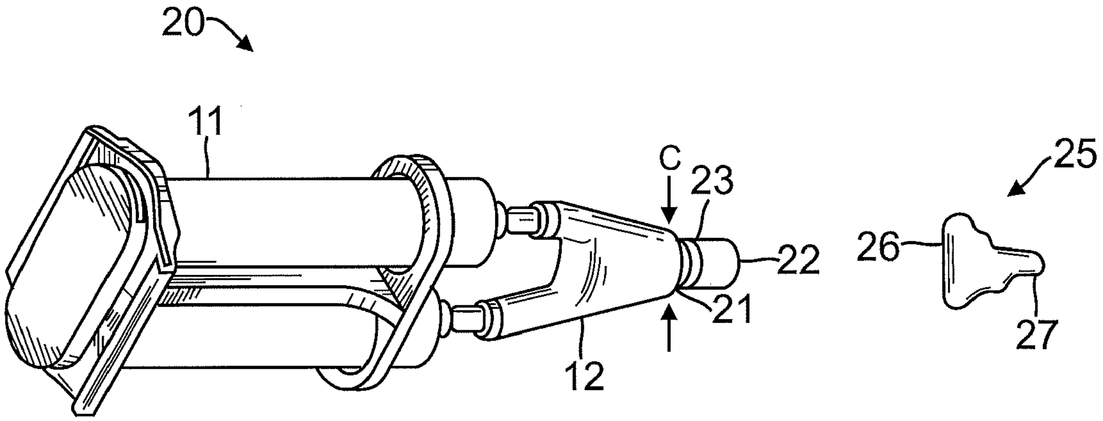
FIG. 2 is a semi-schematic perspective view of the system for making an earpiece of FIG. 1, wherein the balloon has been detached from the mixer of the two-component syringe and defines an earpiece, such as subsequent to dispensing material from the two-component syringe into the balloon while the balloon is in an ear canal.

The two-component syringe 11 dispenses the two components that are mixed, injected into the ear canal, and cured so as to become an earpiece (such as earpiece 25 of FIG. 2). The two components can be a two-part silicon compound such as that commonly used to make contemporary custom earplugs as discussed above, for example.

The mixer 12 can attach to the two-component syringe 11. Alternatively, the mixer 12 can be integrally formed with the two component syringe 11. The mixer 12 receives the two components from the two-component syringe 11 and mixes them to form a compound that can be injected into the user's ear canal. The compound can be injected into the user's ear canal from the two-component dispensing container/mixer 20.

The mixer 12 can simply add the two components to one another. The mixer 12 can contain structures that enhance mixing of the two components. The mixer 12 can be either static (having no moving parts) or dynamic (having moving parts). The mixer 12 can be either powered or unpowered.

Examples of mixers are disclosed in U.S. Pat. No. 7,018,357 issued to Emmons on Mar. 28, 2006, and entitled External Mixer Assembly; U.S. Pat. No. 4,801,008 issued to Rich on Jan. 31, 1989, and entitled Dispensing Device Having Static Mixer In Nozzle; and U.S. Pat. No. 4,976,547 issued to Hisanaga on Dec. 11, 1990, and entitled Continuous Two-Liquid Type Mixer, the entire contents of all of which are hereby expressly incorporated by reference.

A balloon 14 can be attached to the two-component dispensing container/mixer 20, such as to the distal end thereof. For example, the balloon 14 can be attached to a distal end of the mixer 12 as discussed in detail below.

Different size balloons can be provided such that a particular balloon can be selected so as to help define the size of the earpiece and the distance to which the two-component compound extends into the ear canal. A smaller diameter balloon will tend to result in the making of a smaller earpiece and can be selected for smaller ear canals. A shorter balloon will tend to lessen the distance that the two-component compound is injected into the ear canal. Thus, the balloon can be matched to the user's ear canal so as to provide a better fit of the earpiece to the user's ear.

Figure 9:
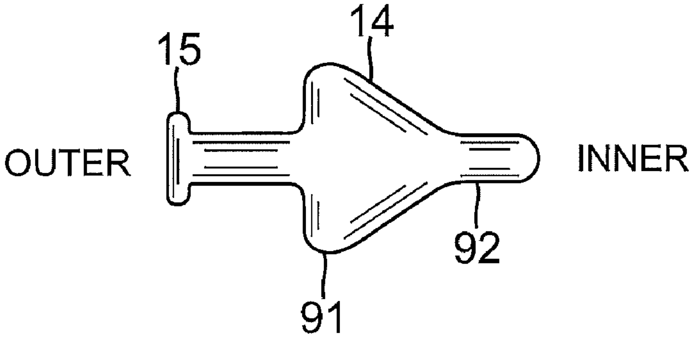
FIG. 9 is a semi-schematic, enlarged side view of a generally tapered balloon having a larger diameter at an outer end thereof and a smaller diameter at an inner end thereof, according to an embodiment.

The unfilled balloon can have a shape that conforms, at least to some degree, to the shape of an earpiece. For example, the outer end of the unfilled balloon can have a larger diameter than the inner end thereof as shown in FIG. 9 and discussed below. The unfilled balloon can be generally tapered in diameter from the outer end to the inner end thereof.

The unfilled balloon can have a shape that is somewhat similar (although smaller since it is unfilled) to the shape of the earpiece 25 of FIG. 2. Thus, the unfilled balloon can be shaped much like a finished earpiece.

Referring now to FIG. 2, as the plunger of the two-component syringe 11 is pushed, the balloon 14 (FIG. 1) and/or the ear canal and conchae fill with the mixed two-component compound. The balloon and the compound expand so as to conform to the shape of the user's ear, i.e., the ear canal and/or conchae. Thus, a custom earpiece is formed. The custom earpiece conforms to the shape of the user's outer ear, i.e., the conchae, and to the shape of the user's ear canal.

Optionally, the balloon 14 can be omitted and the compound can be injected directly into the ear canal of the user. Use of the balloon assures that the compound does not extend too far into the ear canal. Use of the balloon also provides a protective and easily cleaned covering for the earpiece.

The length, Dimension A, of the balloon is selected such that the earpiece does not touch the eardrum. Dimension A can be selected such that there are one, two, three, four, five, or more millimeters of distance between the distal end of the earpiece and the eardrum. Dimension A can be selected such that there is any desired distance between the distal end of the earpiece and the eardrum.

The diameter, Dimension B, of the balloon is selected such that a desired size (diameter, for example) of the earpiece can readily be made therewith. Generally, a larger diameter balloon will result in the ability to make a larger earpiece.

The two-component dispenser/mixer 20 can comprise a stop 21 that is configured to limit insertion thereof into the ear canal. For example, the diameter, Dimension C, of the distal end of the mixer 12 can be selected such that it is greater than the diameter of the opening of the ear canal. Thus, the two-component dispenser/mixer 20 can be inhibited from entering the ear canal and the distance to which the balloon 14 extends into the ear canal can be limited.

The earpiece 25 can have an outer portion 26 that fits into the conchae of the user's ear and can have an inner portion 27 that fits into the ear canal. The distance that the inner portion 27 extends into the ear canal is determined by the length, Dimension A, of the balloon and by the position of the stop 21 upon the two-component dispenser/mixer 20.

The balloon 14 can attach to the two-component dispenser/mixer 20 via a nipple 22 formed at the distal end of the two-component dispenser/mixer 20. The balloon 14 can slide or unroll over the nipple 22. A groove 23 can be formed within the nipple 22 to receive a bead 15 (FIG. 1) of the balloon 14. The bead 15 of the balloon 14 can be a rolled portion of the proximal end of the balloon 14.

A clamp (not shown) or other mechanism can be used, either with or without the bead 15 and/or groove 23, to hold the balloon 14 upon the nipple 22. The nipple 22 and the balloon 14 can be sized such that friction, either alone or in combination with a mechanism, holds the balloon 14 upon the nipple.

The balloon 14 can be removably attached to the two-component dispenser/mixer 20, such as via the nipple 22. If the balloon 14 is removably attached to the two-component dispenser/mixer 20, then the balloon can be slid or rolled therefrom.

Alternatively, the balloon 14 can be permanently attached to the two-component dispenser/mixer 20, such as via the nipple 22. Permanent attachment of the balloon 14 to the two-component dispenser can be done by adhesive bonding, ultrasonic welding, or any other desired method. If the balloon 14 is permanently attached to the two-component dispenser/mixer 20, then the balloon 14 can be cut from the two-component dispenser/mixer 20 such as by using scissors.

Figure 3:
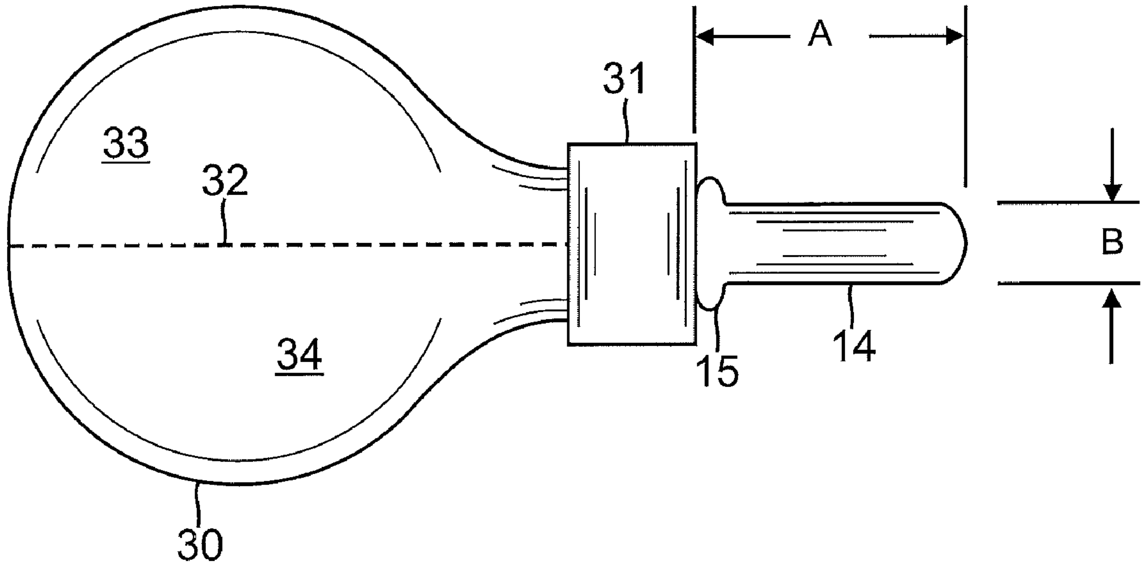
FIG. 3 is a semi-schematic, side view of a squeeze bulb two-component mixing container having a balloon attached thereto according to an example of an embodiment.

Referring now to FIG. 3, a two-component dispensing container can comprise a squeeze bulb 30. A mixer 31 can be attached to the squeeze bulb 30 to define a two-component dispensing container/mixer. The mixer 31 can be either attached to or formed integrally with the squeeze bulb 30. Again, the mixer 31 can be passive or dynamic, as well as powered or unpowered, as discussed above.

An internal diaphragm 32 can be used to separate the squeeze bulb 30 into two chambers, 33 and 34. Each chamber, 33 and 34, can contain one of the two components of the two-component compound that is dispensed from the two-component dispenser/mixer.

Alternatively, the two-component dispenser/mixer can comprise a squeeze bulb 30 having two separate chambers formed in another manner. For example, the two-component dispenser/mixer can comprise two separate squeeze bulbs that are attached to one another. The two-component dispenser/mixer can comprise two separate squeeze bulbs that are not attached to one another, but that provide their respective components to a common mixer.

Figure 4:
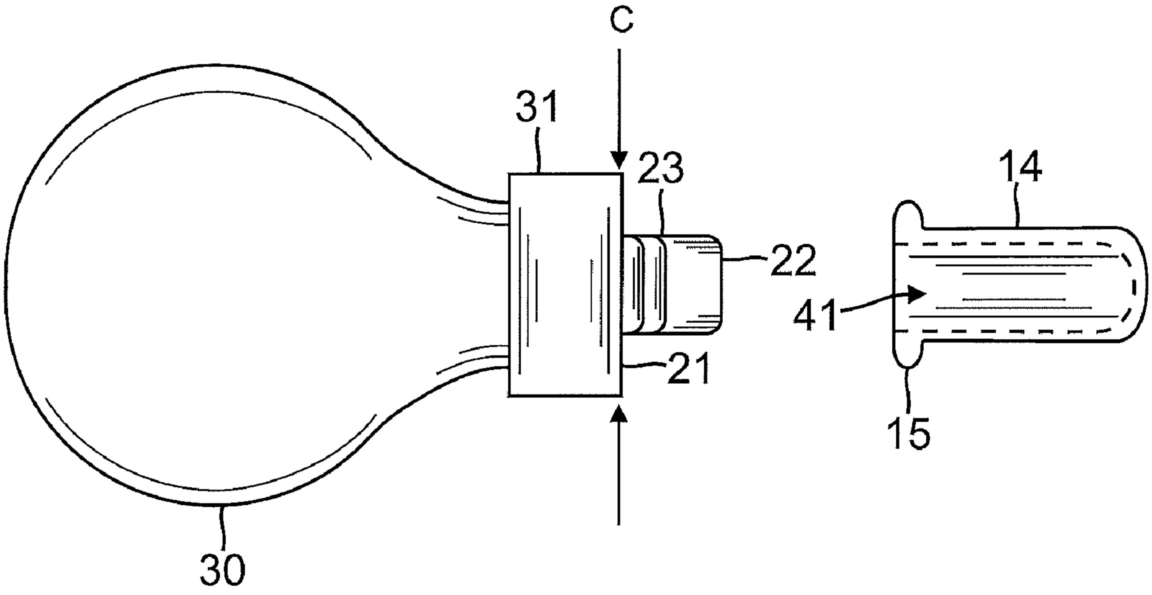
FIG. 4 is a semi-schematic, side view of the squeeze bulb two-component mixing container and balloon of FIG. 3, showing the balloon detached from the squeeze bulb two-component mixing container.

Referring now to FIG. 4, a nipple 22 having a groove 23 formed thereon can be used to attach the balloon 14, as discussed above. A diameter, Dimension C, of the mixer can again be used to define a stop 21 that limits insertion of the two-component dispenser/mixer into the ear canal.

The balloon 14 has a cavity 41 therein. Compound from the two-component dispenser/mixer is dispensed into this cavity 41 so as to expand the balloon 14 and thereby form the custom earpiece 25.

Figure 5:
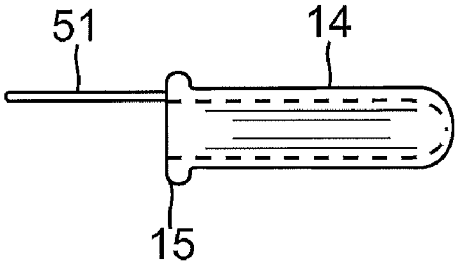
FIG. 5 is a semi-schematic side view of the balloon of FIG. 1 having a handle formed thereon.

Referring now to FIG. 5, a handle 51 can be formed to the balloon 14. The handle can be formed of the same material as the balloon 14 or can be formed of a different material. The handle 51 can be integrally formed with the balloon 14 or can be formed separate with respect to the balloon 14 and then attached thereto.

Figure 6:
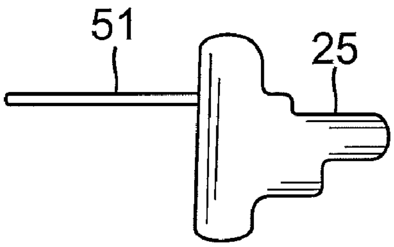
FIG. 6 is a semi-schematic, side view of an earpiece made using the balloon of FIG. 5 and thus having a handle formed thereon.

Referring now to FIG. 6, an earpiece 25 formed from the balloon of FIG. 5 has a handle 51. The handle 51 of the earpiece 25 can be used to hold the earpiece 25, such as during insertion into the ear canal and removal thereof.

A hole can be drilled or otherwise formed in an earpiece that is formed according to an embodiment. The hole can then be used to communicate sound from a hearing aid or a communications system to the eardrum while the earpiece is being worn. Alternatively, the balloon can have a tube disposed therein such that a bore is formed when the two-component compound is dispensed into the balloon, as discussed below.

Figure 7:
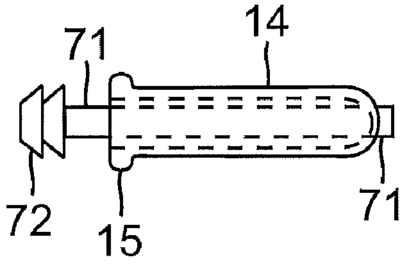
FIG. 7 is a semi-schematic side view of a balloon having a tube passing therethrough so as to define a bore in an earpiece made therewith.

Referring now to FIG. 7, a tube 71 can be disposed substantially within the balloon 14. The tube 71 can have barbs 72 formed upon the proximal end thereof. The tube 71 can define a bore through an earpiece formed using the balloon 14 as discussed below.

Figure 8:
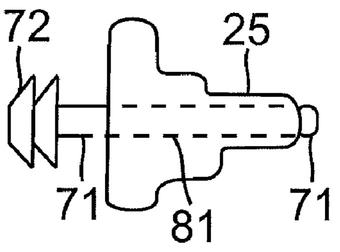
FIG. 8 is a semi-schematic, enlarged side view of an earpiece made using the balloon of FIG. 7 and thus having a bore formed therethrough.

Referring now to FIG. 8, an earpiece 25 formed from the balloon of FIG. 7 has a bore 81 (defined by the tube 71) extending therethrough. The bore can be used to transmit sound from a hearing aid, two-way radio, or other device to the user's eardrum.

Barbs 72 formed upon the tube facilitate attachment of acoustic tubing to the earpiece 25, as is done according to contemporary practice to facilitate the use of such earpieces with devices such as hearing aids and two-way radios.

For example, acoustic tubing from the speaker of a two-way radio can be attached to the tube 71 of earpiece 25 via the barbs 72 thereof. Thus, sound from the speaker of the two-way radio can be provided to the user's eardrum as is commonly done with police, fire, and military two-way radios. In a similar manner, sound from a hearing aid, such as a behind-the-ear (BTE) hearing aid can be heard.

To use the system for making a custom earpiece, a two-component dispenser/mixer is provided. The balloon 14 can be provided pre-attached (such as at the factory), either removably or permanently, to the two-component dispenser/mixer 20. Alternatively, the balloon 14 can be attached immediately prior to use. If the balloon 14 is attached immediately prior to use, a cap can seal the two-component dispenser/mixer to inhibit premature curing of the two-component compound.

The balloon 14 can be inserted into the ear canal until the stop 21 of the two-component dispenser/mixer 20 inhibits further insertion of the balloon 14. The two-component compound is dispensed into the balloon 14 (and consequently into the ear canal) by pushing the plungers of the embodiment of FIGS. 1 and 2 or by squeezing the squeeze bulb 30 of the embodiment of FIGS. 3 and 4. The amount of two-component compound provided by the two-component dispensing container can be limited to that amount necessary to form a single earpiece to prevent dispensing too much of the two-component compound into the ear canal.

After the two-component compound has been dispensed, the balloon 14 can be detached from the two-component dispenser/mixer 20. The balloon 14 containing the two-component compound is left in the ear long enough to cure (long enough to maintain its shape when removed from the ear). The open end of the detached balloon can be closed. A clip can be used to close the balloon. The clip can be removed from the balloon after the two-component compound has cured. Alternatively, the clip can remain on the balloon after the two-component compound has cured.

The balloon 14 can be removed from the cured two-component compound after the cured earpiece has been removed from the ear. Thus, the finished earpiece can omit the balloon 14.

Alternatively, the balloon 14 can remain on the cured two-component compound after the cured earpiece has been removed from the ear. Thus, the finished earpiece can include the balloon 14, which can provide a durable and easily cleaned cover therefor.

The two-component dispensing container can contain enough of the two-component compound to make a plurality of earpieces. The two-component dispensing container can be graduated so as to provide an indication of how much of the two-component compound is to be dispensed into a single ear. For example, a two-component dispensing syringe can have lines formed thereon to indicate quantities needed for one ear. The lines can be similar to the dosage lines on a medical syringe.

The two-component dispensing container can contain only enough of the two-component compound to make a single earpiece. This configuration has the advantage of preventing the use of too much of the two-component compound. Thus, inadvertent contact with the eardrum can be better inhibited. Use of the correct amount of the two-component compound also tends to provide a better fit of the earpiece.

Different two-component dispensing containers can be provided for different sizes of ears. For example, small, medium, and large two-component dispensing containers can be provided to provide the necessary amount of the two-component compound for small, medium, and large ears. For example, a medium two-component dispensing container can contain the amount of the two-component compound needed to make one medium size earpiece.

Referring now to FIG. 9, the balloon 14 can conform in shape, at least somewhat, to the shape of a finished earpiece (and consequently to the shape of the ear canal for which the earpiece is intended to be used). For example, the balloon 14 can be tapered such that it has a larger diameter 91 portion proximate an outer end thereof and such that it has a smaller diameter portion 92 proximate an inner end thereof.

One or more embodiments of the present invention provide an earpiece suitable for use as an earplug, hearing aid earpiece, and/or communications earpiece. The earpiece is custom fit to the user's outer ear and ear canal such that it is comfortable to wear and such that it seals the ear canal in a manner that enhances its effectiveness in inhibiting the transmission of undesirable ambient sound through the ear canal.

One or more embodiments provide a safer, more convenient, and quicker method for making custom earpieces suitable for use as earplugs, hearing aid earpieces, and/or communications earpieces. Safety can be enhanced by limiting the amount by which the two-component compound extends into the ear canal. The use of a balloon and a stop tend to limit the amount of two-component compound used and tend to limit the distance to which the two-component compound is inserted into the ear. The balloon and the stop thus tend to mitigate the likelihood of damage to delicate tissues of the ear, such as the eardrum.

Convenience is enhanced and the process of making custom earpieces is made quicker by eliminating the need to select ingredients of the two-component compound, measure the ingredients, and manually mix the ingredients. Eliminating the need to select ingredients of the two-component compound, measure the ingredients, and manually mixing the ingredients also mitigates the likelihood of making a mistake since wrong ingredients cannot as easily be selected, wrong proportions cannot as easily be measured, and the ingredients cannot be easily mixed improperly, e.g., insufficiently.

Embodiments described above illustrate, but do not limit, the invention. It should also be understood that numerous modifications and variations are possible in accordance with the principles of the present invention. Accordingly, the scope of the invention is defined only by the following claims.

The invention claimed is:

1. A system for making an earpiece, the system comprising:

a two-component dispensing container having two components stored therein such that the two components are kept separate until the two components are dispensed from the two-component dispensing container, the two components being suitable to at least partially define an earpiece after the two components are mixed together;

a mixer for mixing the two components as the two components are dispensed from the two-component dispensing container;

a balloon permanently attached to the two-component dispensing container such that the two components are dispensed into the balloon after the two components are mixed; and wherein the balloon is configured to at least partially define an earpiece after the two components are dispensed into the balloon.

2. The system as recited in claim 1, further comprising a stop that at least partially determines how far the balloon can be inserted into an ear canal.

3. The system as recited in claim 1, further comprising a stop formed upon the mixer, the stop at least partially determining how far the balloon can be inserted into an ear canal.

4. The system as recited in claim 1, wherein the balloon is configured to extend into the ear canal by a distance less than the distance to the eardrum.

5. The system as recited in claim 1, wherein the two components form a silicon compound when mixed.

6. The system as recited in claim 1, wherein the earpiece is substantially solid so as to at least partially define an earplug.

7. The system as recited in claim 1, wherein the earpiece comprises a bore so as to at least partially define an earpiece for a hearing aid or for communications.

8. The system as recited in claim 1, wherein the two-component dispensing container comprises a two-component syringe.

9. The system as recited in claim 1, wherein the two-component dispensing container comprises a two-component squeeze bulb.

10. The system as recited in claim 1, further comprising a handle formed to the balloon.

11. The system as recited in claim 1, further comprising a tube disposed within the balloon so as to at least partially define a bore through the earpiece after the two-component compound has been dispensed into the balloon.

12. The system as recited in claim 1, further comprising a nipple formed upon the two-component dispensing container to which the balloon is attached.

13. The system as recited in claim 1, further comprising a nipple formed upon the two-component dispensing container to which the balloon is attached, the nipple having a groove formed therein to receive a bead of the balloon.

14. A system for making an earplug, the system comprising:

a two-component dispensing container having two components stored therein such that the two components are kept separate until the two components are dispensed from the two-component dispensing container, the two components being suitable to at least partially define an earplug after the two components are mixed together;

a mixer for mixing the two components as the two components are dispensed from the two-component dispensing container;

a balloon attachable to the mixer such that the two components are dispensed into the balloon after the two components are mixed; and wherein the balloon is configured to at least partially define a substantially solid earplug after the two components are dispensed into the balloon.

15. A system for making an earpiece, the system comprising:

a two-component squeeze bulb having two components stored therein such that the two components are kept separate until the two components are dispensed from the two-component squeeze bulb, the two components being suitable to at least partially define an earpiece after the two components are mixed together;

a mixer for mixing the two components as the two components are dispensed from the two-component squeeze bulb;

a balloon attachable to the mixer such that the two components are dispensed into the balloon after the two components are mixed; and wherein the balloon is configured to at least partially define an earpiece after the two components are dispensed into the balloon.

16. A two component dispensing system comprising:

a two-component squeeze bulb;

a mixer configured to mix material dispensed from the two-component squeeze bulb; and wherein the two component squeeze bulb is configured to facilitate attachment of a balloon thereto, the balloon being configured to at least partially define an earpiece when material from the two-component squeeze bulb is dispensed thereinto.

17. The two component dispensing system as recited in claim 16, wherein the balloon attaches to the two component squeeze bulb via the mixer.

18. A balloon configured to attach to a two-component dispensing container and configured to at least partially define an earpiece when filled with material from the two component dispensing container, wherein the balloon comprises a larger diameter portion proximate an outer end of the balloon and a smaller diameter portion proximate an inner end of the balloon.

19. The balloon as recited in claim 18, wherein the balloon comprises a tapered portion that is larger proximate an outer end of the balloon than proximate an inner end of the balloon.

20. A two-component dispensing system for making an earpiece, the two-component dispensing system comprising:

a two-component squeeze bulb;

two components contained within the two-component squeeze bulb;

a mixer attached to the two-component squeeze bulb such that the two components are mixed as the two components are dispensed; and wherein the two components are suitable for forming an earpiece.

21. The two-component dispensing system as recited in claim 20, wherein the two-component squeeze bulb is configured to attach a balloon thereto.

22. A system for making an earpiece, the system comprising:

a two-component dispensing container having two components stored therein such that the two components are kept separate until the two components are dispensed from the two-component dispensing container, the two components being suitable to at least partially define an earpiece after the two components are mixed together;

a mixer for mixing the two components as the two components are dispensed from the two-component dispensing container;

a balloon attachable to the mixer such that the two components are dispensed into the balloon after the two components are mixed; and wherein the balloon is configured to at least partially define an earpiece after the two components are dispensed into the balloon.

23. The system as recited in claim 22, further comprising a stop formed upon the mixer, the stop at least partially determining how far the balloon can be inserted into an ear canal.

24. A system for making an earpiece, the system comprising:

a two-component dispensing container having two components stored therein such that the two components are kept separate until the two components are dispensed from the two-component dispensing container, the two components being suitable to at least partially define an earpiece after the two components are mixed together;

a mixer for mixing the two components as the two components are dispensed from the two-component dispensing container;

a balloon attachable to the mixer such that the two components are dispensed into the balloon after the two components are mixed;

a handle formed to the balloon; and wherein the balloon is configured to at least partially define an earpiece after the two components are dispensed into the balloon.

25. A two-component dispensing system for making an earpiece, the two-component dispensing system comprising:

a two-component squeeze bulb configured to attach a balloon thereto;

two components contained within the two-component squeeze bulb; and wherein the two components are suitable for forming an earpiece.

26. The two-component dispensing system as recited in claim 25, further comprising a mixer attached to the two-component squeeze bulb such that the two components are mixed as the two components are dispensed.

* * * * *